United States Patent
Helmreich

(10) Patent No.: US 8,688,076 B2
(45) Date of Patent: Apr. 1, 2014

(54) SUBSCRIBER IDENTIFIER AND METHOD FOR SUBSCRIBER AUTHENTICATION

(75) Inventor: Frank Helmreich, Alpen (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 13/294,518

(22) Filed: Nov. 11, 2011

(65) Prior Publication Data

US 2012/0122423 A1 May 17, 2012

(30) Foreign Application Priority Data

Nov. 12, 2010 (DE) .......................... 10 2010 043 878

(51) Int. Cl.
- *H04M 1/66* (2006.01)
- *H04M 1/68* (2006.01)
- *H04M 3/16* (2006.01)

(52) U.S. Cl.
USPC ..................... 455/410; 455/435.1; 455/552.1; 455/558

(58) Field of Classification Search
USPC ......... 455/410, 411, 552.1, 435.1–435.3, 558
See application file for complete search history.

(56) References Cited

U.S. PATENT DOCUMENTS

| | | | | |
|---|---|---|---|---|
| 5,668,875 A | * | 9/1997 | Brown et al. | 380/248 |
| 2007/0249291 A1 | * | 10/2007 | Nanda et al. | 455/73 |
| 2012/0135715 A1 | * | 5/2012 | Kang et al. | 455/412.1 |
| 2012/0214460 A1 | * | 8/2012 | Russell | 455/418 |

FOREIGN PATENT DOCUMENTS

EP 869692 A1 * 10/1998 ............... H04Q 7/38

* cited by examiner

*Primary Examiner* — Vladimir Magloire

(74) *Attorney, Agent, or Firm* — International IP Law Group, PLLC

(57) ABSTRACT

The subject innovation relates to a subscriber identifier for subscriber authentication in a mobile telecommunications network. The subscriber identifier comprises a memory device that contains a first subscription data record for subscriber authentication in a first mobile telecommunications network. The memory device further contains a second subscription data record for subscriber authentication in a second mobile telecommunications network. Based on an available mobile telecommunications network, one of the contained subscription data records being usable for subscriber authentication in each case.

12 Claims, 1 Drawing Sheet

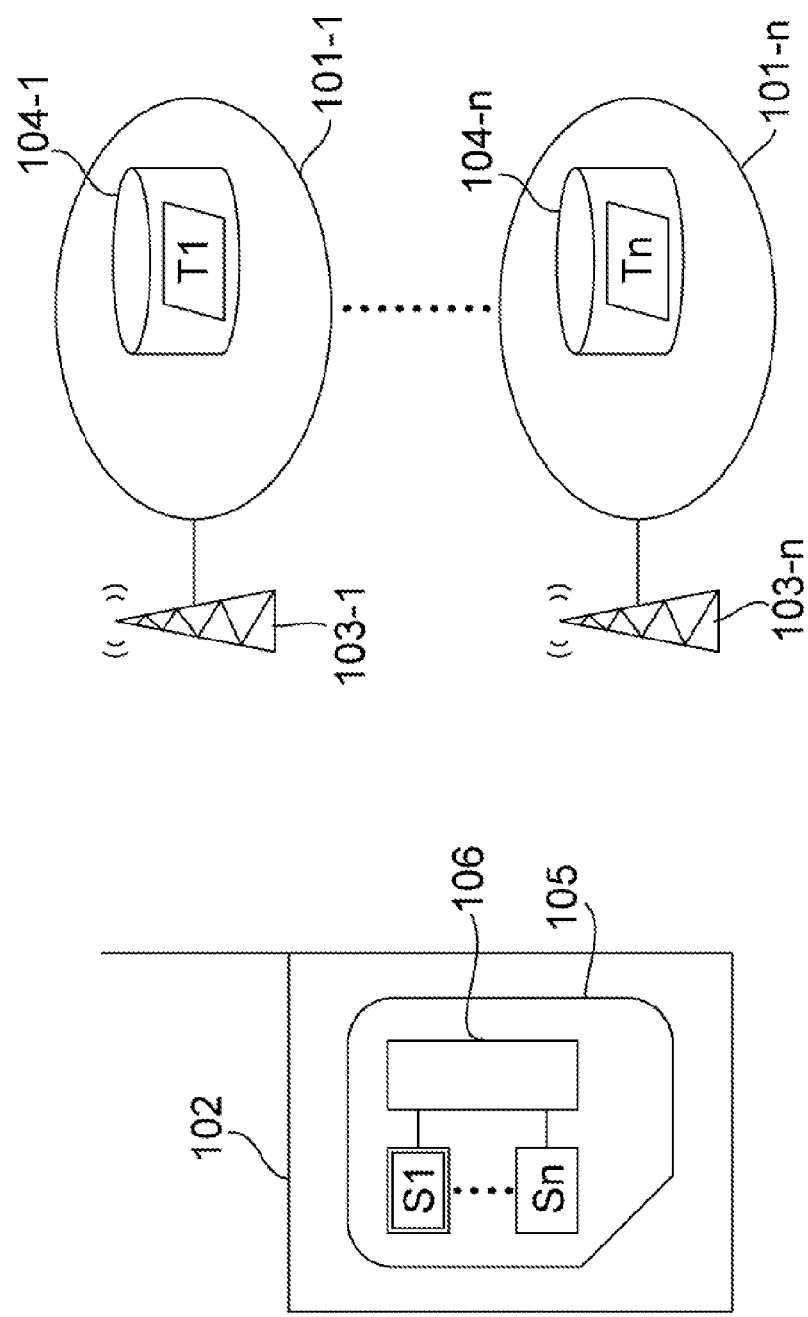

SUBSCRIBER IDENTIFIER AND METHOD FOR SUBSCRIBER AUTHENTICATION

CROSS-REFERENCE TO RELATED APPLICATION

This application claims priority to German (DE) Patent Application No. 102010043878.2-31, filed on Nov. 12, 2010, the contents of which are incorporated by reference as if set forth in their entirety herein.

BACKGROUND

A mobile telecommunications subscriber is normally associated with a home network which normally is the mobile telecommunications network of the service provider with which the subscriber has entered into a mobile telecommunications agreement. In the home network, a phone number is assigned to the subscriber, and additional subscriber data is registered, which is associated with subscription data that is checked, particularly when the subscriber signs in to a mobile telecommunications network. The subscription data comprises a subscriber identifier and additional authentication parameters, and this data is normally stored in a subscriber identifier configured as a chip card that is inserted into the mobile telecommunications device of the subscriber.

Using his/her subscription data, a subscriber of a home network can also sign in to external networks, provided that they allow access by subscribers of this home network. This capability is also referred to as roaming and it makes it possible to use mobile telecommunications services when the subscriber is currently in a geographical region in which the home network is not available. In order to authenticate the subscriber, external networks normally make use of the subscriber data that is registered in the home network of the subscriber, and the subscriber can be reached in an external network at the phone number that is valid in the home network.

However, a drawback of roaming is that normally higher fees are charged for using mobile telecommunications services in external networks. Moreover, it is often the case that certain mobile telecommunications services such as, for example, data services, can only be used to a limited extent or can even be blocked entirely.

In order to access mobile telecommunications services in regions that are not covered by the home network and in order to avoid the drawbacks of roaming, a mobile telecommunications subscriber can enter into additional mobile telecommunications agreements with mobile telecommunications service providers whose mobile telecommunications networks provide services in the regions in question. In this manner, the mobile telecommunications subscriber can access several home networks that can cover several geographical regions. However, for each of the different home networks, he/she receives a subscriber identification card that especially contains the subscription data for the home network in question, and he/she has to use the matching subscriber identification card in each of his/her home networks in order to avoid roaming.

In order to use the subscriber identification card of the available home network in each case, the mobile telecommunications user can switch the subscriber identification card inside his/her mobile telecommunications devices when he/she changes to another home network. However, this is awkward and also means that they cannot be reached at the phone number that is associated with him/her in another home network. As an alternative, the subscriber can use several mobile telecommunications devices that each contain one of the subscriber identification cards. This, however, also involves considerable effort.

Another possibility for using subscription data for different home networks is the mobile telephone described in EP 1 231 800 A1, which can hold and use multiple subscriber identification cards. However, this option means that the user is limited to using a special device that has holders for two subscriber identification cards.

SUMMARY

The subject innovation relates to the authentication of subscribers in mobile telecommunications networks. In particular, the subject innovation relates to a subscriber identifier and to a method for subscriber authentication in a mobile telecommunications network.

The subject innovation may facilitate access to a plurality of home networks.

According to a first aspect, the subject innovation suggests a subscriber identifier for subscriber authentication in a mobile telecommunications network, containing a first subscription data record for subscriber authentication in a first mobile telecommunications network. Moreover, at least a second subscription data record for subscriber authentication in a second mobile telecommunications network is contained, based on an available mobile telecommunications network, in each case, one of the contained subscription data records being usable for subscriber authentication.

According to another aspect of the subject innovation, a method is suggested for authenticating a subscriber in a mobile telecommunications network, in the method data from a subscription data record stored in a subscriber identifier being used. Moreover, one of several subscription data records stored in the subscriber identifier is activated based on an available mobile telecommunications network, and the data used for the subscriber authentication is obtained from the activated subscription data record.

On the basis of the multiple subscription data records stored in the subscriber identifier, a subscriber can use additional mobile telecommunications networks as his/her home networks and in this manner, he/she can avoid a roaming access to these mobile telecommunications networks. Advantageously, only one subscriber identifier is used for this purpose, so that the subscriber can limit himself/herself to using just one mobile telecommunications device with the subscriber identifier, and he/she does not need a mobile telecommunications device that can be operated with multiple individual subscriber identifier that are especially contained in chip cards.

The available mobile telecommunications networks preferably transmit identifiers that are received by the subscriber identifier or by the appertaining device. In one embodiment, the received identifiers can be used to select a subscription data record. Preferably, the received identifiers of the available networks are also used as the basis for the selection of the mobile telecommunications network to which the subscriber is being signed in.

In one embodiment of the subscriber identifier and of the method, the subscriber identifier comprises a controller that is configured to activate, based on a received identifier of the available mobile telecommunications network, a subscription data for the subscriber authentication. The subscription data record that has been activated in each case is used for the subscriber authentication. For the subscriber authentication, preferably exactly one subscription data record is used in each case so as to avoid conflicts between different subscription data records. The controller is preferably configured as a software program that is executed in the subscriber identifier.

One embodiment of the subscriber identifier and of the method comprises that the controller is configured to activate in response to a receipt of an identifier of a mobile telecommunications network a subscription data record for the subscriber authentication in this mobile telecommunications network. In this manner, it is rendered possible for the subscriber to always being signed in as a home user to one of the available mobile telecommunications networks, provided that the subscriber identifier has a subscription data record for at least one of the available mobile telecommunications networks.

Furthermore, one embodiment of the subscriber identifier and of the method is characterized in that the controller is configured to activate a prescribed subscription data record when the subscriber identifier is switched on and/or after disconnection of a connection to a mobile telecommunications network. This achieves that a defined subscription data record is activated when the subscriber identifier is switched on and after a connection has been lost. In particular, this leads to a defined behavior of the subscriber identifier. The selection of another subscription data record is preferably made on the basis of the above-mentioned prescribed subscription data record, and in response to a selection, the activated subscription data record is switched in order to be used for subscriber authentication in a mobile telecommunications network.

Another embodiment of the subscriber identifier and of the method comprises that the controller is configured to activate a prescribed subscription data record for use in the subscriber authentication if no identifier of any of the mobile telecommunications networks that are associated with the subscription data records stored in the subscriber identifier is received. As a result, a roaming access to a mobile telecommunications network is made possible making use of a prescribed subscription data record, if none of the mobile telecommunications networks for which a subscription data record of the subscriber is stored in the subscriber identifier is available. The prescribed subscription data record can be the subscription data record that is also activated when the subscriber identifier is switched on and/or after disconnection of a connection to a mobile telecommunications network. Likewise, it can be a different subscription data record that is selected according to at least one prescribed criterion, for example, according to countries to which available mobile telecommunications networks belong. In this manner, it can especially be achieved that, if applicable, the subscriber can make use of national roaming and can avoid international roaming.

It may be the case that the subscription data records provided in the subscriber identifier are not complete. For example, this can result from the fact that the mobile telecommunications network or its operator has not made available the included information. Therefore, a further embodiment of the subscriber identifier and the method provides that the controller is configured to activate the prescribed subscription data record, if a subscription data record associated with an available mobile telecommunications network is incomplete, and that after a subscriber authentication using the prescribed subscription data record Information is transmitted from the mobile telecommunications network to the subscriber identifier and stored in the incomplete subscription data record. Hereby, the subscription data record can be completed. Then, the subscriber can be signed in to the accompanying mobile telecommunications network again.

The use of the data contained in the subscription data record for the subscriber authentication can comprise the transmission of individual data items to the mobile telecommunications network. Likewise, it can be provided that the data is used to generate further information that is sent to the mobile telecommunications network. In one embodiment of the subscriber identifier and of the method, it is provided that the first and/or the second subscription data record comprises a subscriber identifier that is registered in the respective mobile telecommunications network, particularly in a home register of the respective mobile telecommunications network. The subscriber identifier is preferably sent to the mobile telecommunications network in order to identify the subscriber. In another embodiment of the subscriber identifier and of the method, the first and/or the second subscription data record comprises at least one cryptographic authentication key. Using the authentication key, for example, information transmitted from a mobile telecommunications network can be encrypted and sent back to the mobile telecommunications network, which checks the information in order to authenticate the subscriber. In particular, the encrypted information can be compared to a version of the encrypted information that was generated using a copy of the authentication key that has been stored in the mobile telecommunications network in question, and the subscriber is authenticated successfully if the encrypted information matches.

Moreover, one embodiment of the subscriber identifier and of the method is characterized in that the subscriber identifier contains multi-network data that can be accessed independently of the activation of a subscription data record. The multi-network data—which can be, for example, personal data of the subscriber, such as an address book and/or sent or received messages—is thus always available for the subscriber, regardless of which mobile telecommunications network the subscriber is signed in to and regardless of which subscription data record is used for this purpose.

One embodiment of the subscriber identifier and of the method provides that the subscriber identifier is contained at least partially in a chip card that can be used in a mobile telecommunications device. In particular, this can be a SIM (Subscriber Identity Module) card or a chip card with a USIM (Universal Subscriber Identity Module) application. Preferably, at least the subscription data records are stored in the chip card. Moreover, the controller can advantageously be contained in the chip card. In particular, the controller can be configured as a software program that is executed in the chip card. Likewise, however, the subscriber identifier can also be integrated into the device itself.

In addition to the subscriber identifier and the method, according to another aspect, the subject innovation also suggests a mobile telecommunications device that comprises the subscriber identifier or one of its embodiments. Further, a mobile telecommunications system is suggested that comprises the subscriber identifier or one of its embodiments and/or a mobile telecommunications device of the type described before.

Within the mobile telecommunications networks which are associated with the various subscription data records, in one embodiment, the subscriber is associated in each case with a phone number via which, for example, calls to the subscriber can be established and/or messages can be addressed to the subscriber. When the subscriber is signed in to a mobile telecommunications network using a subscription data record, he/she can be registered as not being reachable in terms of the phone numbers that are associated with the other subscription data record that are stored in the subscriber identifier.

In order to nevertheless ensure that the subscriber can be reached at another phone number, one embodiment of the mobile telecommunications system comprises that with each of the first and second subscription data records a phone number is associated. Moreover, in this embodiment the system comprises a call forwarder that is configured to initiate, based on a notification about the activation of the second subscription data record, call forwarding from the phone number associated with the first subscription data record to the phone number associated with the second subscription data record. The notification about the activation can especially indicate that the second subscription data record has been or shall be activated.

In this manner, the subscriber can also be reached at the phone number that is associated with the first subscription data record even when he/she signs in to a different mobile telecommunications network using subscription data that is associated with this network. In one embodiment of the system, the call forwarder is contained in the first mobile telecommunications network. Another embodiment of the system is characterized in that the subscriber identifier and/or the second mobile telecommunications network is configured to send the notification about the activation to the call forwarder.

Furthermore, it is advantageously provided that charges for the utilization of mobile telecommunications services by the subscriber are invoiced via a prescribed mobile telecommunications network. Therefore, one embodiment of the mobile telecommunications system comprises that a mobile telecommunications network is configured to transmit, after the subscriber authentication in the mobile telecommunications network using a subscription data record activated in the subscriber identifier, to a mobile telecommunications network associated with a prescribed subscription data record accounting information about a utilization of mobile telecommunications services. The prescribed subscription data record can be specified by the subscriber identifier when signing in to the mobile telecommunications network. As an alternative, the prescribed subscription data record can be stored in the mobile telecommunications network.

BRIEF DESCRIPTION OF THE DRAWINGS

The above-mentioned and additional advantages, special features and practical refinements of the subject innovation are also elucidated on the basis of the embodiments which will be described below making reference to FIG. 1.

FIG. 1 is a block diagram showing a mobile telecommunications device into which a subscriber identifier according to the subject innovation has been inserted and which can be connected to a plurality of home networks.

DETAILED DESCRIPTION OF SPECIFIC EMBODIMENTS

FIG. 1 schematically shows a mobile telecommunications system that comprises at least two mobile telecommunications networks 101-$i$ (I=1, . . . , n). The number of mobile telecommunications networks is given in the FIGURE as n (n≥2). The mobile telecommunications networks 101-$i$ allow the establishment of wireless connections to mobile telecommunications devices 102. One such mobile telecommunications device 102 is shown in FIG. 1 by way of example.

Wireless access to the mobile telecommunications networks 101-$i$ is effectuated via associated radio access networks which are constituents of the mobile telecommunications networks 101-$i$. Each radio access network comprises a plurality of radio cells that are each supplied by a base station 103-$i$. By way of example, FIG. 1 shows one base station 103-$i$ for each mobile telecommunications network 101-$i$. The radio access networks preferably support the mobility of the subscriber. When a subscriber moves from one radio cell to a second radio cell within the geographical region that is covered by one radio access network, the connection of the subscriber is transferred from the first radio cell to the second radio cell by a so-called handover. For this purpose, the connection can be switched, for example, from a first base station 103-$i$ that supplies the first radio cell to a second base station 103-$i$ that supplies the second radio cell.

The mobile telecommunications devices 102 are electronic communication devices that may particularly have a radio or the like for establishing a radio connection to a mobile telecommunications network 101-$i$ and that can be configured as mobile devices. Examples of the mobile telecommunications devices 102 that may have a radio or the like are mobile phones, PDAs (Personal Digital Assistants) and notebook computers. Additional examples are so-called M2M (machine-to-machine) devices that are provided for the automatic exchange of information with other devices, and/or telemetric devices or other mobile telecommunications-capable devices that are operated in means of transportation such as vehicles, airplanes and ships.

Each mobile telecommunications network 101-$i$ can provide one or more mobile telecommunications services for utilization. Examples of such services are voice and video telephony, message transmission services such as SMS (Short Message Service) and MMS (Multimedia Messaging Service), as well as data services for access to the Internet or to other networks (not shown in the FIGURE) that are connected to a mobile telecommunications network 101-$i$. In order to access the services offered, circuit switched and/or packet switched connections can be established between the mobile telecommunications networks 101-$i$ and the connected mobile telecommunications devices 102. In order to establish these connections, the mobile telecommunications networks 101-$i$ have switching units, which are not shown in the FIGURE. Moreover, the mobile telecommunications networks 101-$i$ can have additional units, especially units for providing the services, for example, for transmitting messages.

The mobile telecommunications networks 101-$i$ are connected to each other in such a way that communication connections can be established and messages and/or other data can be exchanged between subscribers in different mobile telecommunications networks 101-$i$. Furthermore, the mobile telecommunications networks 101-$i$ are connected to each other in such a way that network units of the various mobile telecommunications networks 101-$i$ can exchange control and/or management data among each other. Such an exchange of data is carried out, for example, in order to perform subscriber authentication when a subscriber is roaming, said procedure being carried out using subscriber data that is stored in a different mobile telecommunications network 101-$i$ than in the mobile telecommunications network 101-$i$ to which the subscriber signs in.

In embodiments that are provided by way of example and that are not to be construed in a limiting manner, the mobile telecommunications networks 101-$i$ can be configured according to a standard of the 3GPP ($3^{rd}$ Generation Partnership Project), for example, according to the GSM (Global System for Mobile Communications) standard, the UMTS (Universal Mobile Telecommunications System) standard, or the LTE/SEA (Long-Term Evolution/Service Architecture Evolution) standard. In these embodiments, the switching units in circuit switched mobile telecommunications networks 101-$i$ or in the circuit switched parts of the mobile telecommunications networks 101-$i$ can be, for instance, MSCs (Mobile Switching Centers). In packet switched networks, the switching units can comprise SGSNs (Serving GPRS Support Nodes) or S-GWs (Serving Gateways) and MMEs (Mobility Management Entities).

In mobile telecommunications networks 101-*i* according to a 3GPP standard, for example, the base stations 103-*i* can each comprise a BSS (Base Station Subsystem) according to the GSM standard with at least one BTS (Base Transceiver Station) and an associated BSC (Base Station Controller), at least one NodeB according to the UMTS standard with an associated RNC (Radio Network Controller) or an eNodeB according to the LTE standard.

In order to manage mobile telecommunications subscribers or the subscriber data associated with the mobile telecommunications subscribers, the mobile telecommunications networks 101-*i* each contain a home register 104-*i* in which subscriber data is stored. The subscriber data of the mobile telecommunications subscribers with whom the mobile telecommunications network 101-*i* is associated as the home network is stored in the home register 104-*i* of a mobile telecommunications network 101-*i*. Such as association can especially result from the fact that the subscriber has entered into a mobile telecommunications agreement with the service provider of that particular mobile telecommunications network 101-*i*.

The data of a subscriber comprises an identifier associated with the subscriber in order to identify the subscriber and a phone number (MSISDN—Mobile Subscriber Integrated Services Digital Network Number) at which voice and/or data connections to the subscriber can be established and/or messages can be sent to the subscriber. The subscriber identifier can contain a part that unambiguously identifies the subscriber and a part that identifies the mobile telecommunications network 101-*i*. In particular, the identifier can be an IMSI (International Mobile Subscriber Identity) containing the MCC (Mobile Country Code) and the MNC (Mobile Network Code) of the mobile telecommunications network 101-*i* and the MSIN (Mobile Subscriber Identification Number) of the subscriber.

Furthermore, the subscriber data can comprise one or more cryptographic authentication keys that are used for the authentication of a subscriber when he/she signs in to the mobile telecommunications network 101-*i*, and these keys are preferably stored in a specially secured manner in the home register 104-*i*. The successful authentication of the subscriber when he/she signs in is a prerequisite for the subscriber to be able to access services of a given mobile telecommunications network 101-*i*.

Moreover, the authorizations of a subscriber to use the services provided by the mobile telecommunications network 101-*i* can be stored in his/her subscriber data. Furthermore, various additional network services such as, for example, call forwarding, can be activated and deactivated via the home register 104-*i*.

In a mobile telecommunications network 101-*i* that is configured according to a 3GPP standard, the associated home register 104-*i* can be an HLR (Home Location Register) and/or an HSS (Home Subscription Server). In these embodiments, the cryptographic keys are stored in a secure AuC (Authentication Center) that is integrated into the home register 104-*i*.

In order to access the mobile telecommunications networks 101-I, subscriber identification units 105 are used, one of which is shown by way of example in FIG. 1. The subscriber identification units 105 can be contained in chip cards that have a microcontroller to execute programs and to store data, and they can be inserted into the mobile telecommunications devices 102 used by the subscribers, as is shown by way of example in FIG. 1 for the mobile telecommunications device 102. Likewise, the subscriber identification units 105 can be integrated into the mobile telecommunications devices 102, for example, in a separate chip or in a main microcontroller of the mobile telecommunications devices 102. In one embodiment, the subscriber identification units 105 comprise data that is stored in the chip card and/or in the device 102 as well as software modules that are implemented in the chip card and/or in the device 102.

In the subscriber identification units 105, particularly subscription data records of subscribers are stored that are used for subscriber authentication when a subscriber signs in to a mobile telecommunications network 101-*i* with his/her mobile telecommunications devices 102. A subscription data record is associated with a subscriber data record in a home register 104-*i* of a mobile telecommunications network 101-*i*, and it contains information that can be checked using the subscriber data. In particular, a subscription data record contains the identifier of the subscriber, and this identifier is preferably also registered in the home register 104-*i*. The subscriber identifier can be a permanent subscriber identifier. In addition or as an alternative to this, it can also be a temporary subscriber identifier that is temporarily associated with the subscriber by a mobile telecommunications network 101-*i*. Moreover, the authentication key of the subscriber can be contained in the subscription data record.

When a subscriber signs in to a mobile telecommunications network 101-*i* using his/her mobile telecommunications devices 102, then in one embodiment, the subscriber identifier is transmitted to the mobile telecommunications network 101-*i*. On the basis of the subscriber identifier, the authentication key of the subscriber is ascertained in the home register 104-*i* and a piece of information, preferably a random number, are encrypted using the authentication key. The information is also sent by the mobile telecommunications network 101-*i* to the mobile telecommunications device 102 and encrypted in the subscriber identification unit 105 of the mobile telecommunications device 102 with the authentication key stored there. The encrypted information is then sent back to the mobile telecommunications network 101-*i* and compared to the encrypted information that was generated with the authentication key stored in the home register 104-*i*. If the encrypted information matches, then the subscriber is successfully authenticated.

When the subscriber signs in to his/her home network, the subscriber data used for purposes of the subscriber authentication is the data that is stored in the home register 104-*i* of the home network. During roaming, that is to say, when the subscriber signs in to an external network, it is likewise the case that the subscriber data that is stored in the home register 104-*i* of the home network is used. In this process, in response to a request, the home network provides the external network with the authentication key and/or with the information that has been encrypted with it. The home network to which the request has to be addressed by the external network can be ascertained, for example, on the basis of the subscriber identifier that was transmitted by the mobile telecommunications device 102 of the subscriber at the time when he/she signed in to in the external network, provided that the subscriber identifier identifies the home network, as is the case, for instance, with a subscriber identifier that is configured as an IMSI.

Aside from the subscription data, the subscriber identification units 105 can contain additional data. This can be, for example, network-specific and/or multi-network control data for access to mobile telecommunications networks 101-*i*, where network-specific control data can be used for access to a specific mobile telecommunications network 101-*i*, and multi-network control data can be used for access to different mobile telecommunications networks 101-$i$. Moreover, additional data about the subscriber can be stored in the subscriber identification unit 105 that is used independently of the access to a mobile telecommunications network 101-$i$. In particular, this data can be an address book of the subscriber in which data pertaining to contacts of the subscriber can be stored, and/or it can be received and/or sent messages of the subscriber.

If the mobile telecommunications networks 101-$i$, as described above, are configured according to a 3GPP standard, the subscriber identification unit 105 can be a SIM card according to the GSM standard and/or a chip card with a USIM application.

The subscriber identification unit 105 shown by way of an example in FIG. 1 makes it possible for a subscriber to be registered as a home user in multiple mobile telecommunications networks 101-$i$. This means that a subscriber is associated with several home networks to which he/she can sign in without having to make a roaming access. In one possible scenario, the various home networks of the subscriber are operated in different geographic regions, especially in different countries, by a service provider that can use the subscriber identification unit 105 in order to allow its customers to access its mobile telecommunications networks 101-$i$ without having to use roaming. Likewise, the various home networks can be operated by different service providers that, for example, have an agreement with each other so that subscribers who have entered into a mobile telecommunications agreement with one of the service providers are also granted access to the mobile telecommunications network 101-$i$ of another service provider, without the subscriber having to access them using roaming.

Multiple subscription data records Si ($i=1, \ldots, n$) for different mobile telecommunications networks 101-$i$ are stored in the subscriber identification unit 105. Each subscription data record Si is associated with a mobile telecommunications network 101-$i$ or with the subscriber data Ti registered for the subscriber in a mobile telecommunications network 101-$i$. In addition, it can be provided that the subscription data records Si are augmented for the various mobile telecommunications networks 101-$i$ by network-specific control parameters for the appertaining mobile telecommunications network 101-$i$ which are then accessed when the mobile telecommunications device 102 is used in the mobile telecommunications network 101-$i$. Such control parameters can specify, for instance, the network units that are supposed to be accessed when certain services are used in the various mobile telecommunications networks 101-$i$. Thus, for different networks, different network units can be prescribed for the use of services, for example, different access points for messaging or data services.

The various subscription data records Si stored in the subscriber identification unit 105 and, if applicable, the associated control parameters, are stored therein during the creation of, or in conjunction with the issuing of the subscriber identification unit 105. Likewise, it can be provided that, during the life cycle of the subscriber identification unit 105, subscription data records Si are augmented and/or deleted. This can be carried out either at a service point of a mobile telecommunications service provider, or via a mobile telecommunications network 101-$i$ using a so-called OTA (Over the Air) mechanism that makes it possible to change data of the subscriber identification unit 105 via the mobile telecommunications network 101-$i$. For securing the remote access to the subscriber identification unit 105 the OTA mechanism utilizes cryptographic procedures, which are carried out using cryptographic keys (OTA keys).

Moreover, it can be provided that subscription data records Si are incompletely installed in the subscriber identification unit 105, at first. For example, this can be provided if not all information contained in the subscription data records are available when the subscription data records are stored. In particular, it can be the case that the authentication key for a mobile telecommunications network 101-$i$ is initially not known, for example, because it is not communicated by the operator of the mobile telecommunications network 101-$i$. In such case, the respective subscription data record Si can initially be stored in the subscriber identification unit 105 without the authentication key. The missing elements of incomplete subscription data records may be obtained later from the respective mobile telecommunications network 101-$i$, as will be explained below.

Also, subscription data records Si for different mobile telecommunications networks 101-$i$ can be stored in subscriber identification units 105 of different subscribers. In the exemplary illustration of FIG. 1, the subscriber identification unit 105 shown has a subscription data record Si for each of the depicted mobile telecommunications networks 101-$i$. Other subscriber identification units 105, however, can contain subscription data records Si for sub-sets of the depicted mobile telecommunications networks 101-$i$ and/or subscription data records Si for other mobile telecommunications networks not shown in FIG. 1.

For signing in to a mobile telecommunications network 101-$i$, one of the subscription data records Si stored in the subscriber identification unit 105 is selected and activated for the subscriber authentication. The other subscription data records are then deactivated. In the embodiment presented, a controller 106 is provided for controlling the activation of the subscription data records Si. The controller 106 can be a software application that is implemented in the subscriber identification unit 105. Within the subscriber identification unit 105, the controller 106 can, for instance, be integrated into an already existing application for network selection or can interact with it so that the network selection can be made or influenced in a manner that will be described below. Likewise, however, the controller 106 can also be configured as an application that is implemented outside of the subscriber identification unit 105 in a mobile telecommunications device 102.

One of the subscription data records Si is configured as a master data record. The mobile telecommunications network 101-$i$ that is associated with the master data record is also referred to below as the main network of the subscriber. The main network can be, for example, the mobile telecommunications network 101-$i$ that the subscriber will probably access most often, and/or the mobile telecommunications network 101-$i$ of the service provider that issues the subscriber identification unit 105 (these mobile telecommunications networks 101-$i$ can also be identical). In the case of the subscriber identification unit 105 shown in FIG. 1, the subscription data record S1 is configured as the master data record and the associated mobile telecommunications network 101-$i$ is configured as the main network. In one embodiment, the master data record S1 is activated especially when the subscriber identification unit 105 is switched on. The subscriber identification unit 105 is switched on by switching on the mobile telecommunications device 102 into which the subscriber identification unit 105 has been inserted. Based on the activated master data record S1, the controller 106 can activate another subscription data record Si, i.e. can change the activation in order to authenticate the subscriber in a specific mobile telecommunications network 101-$i$.

Further, it can be provided that an OTA remote access to the subscriber identification unit 105 is made via the master data record S1. This means that the OTA key or keys required in the subscriber identification unit 105 can be associated with the master data record S1. The associated OTA keys used by the network are stored in the main network 101-1 of the subscriber. Thus, An OTA access can only be carried out through the main network 101-1. Hereby, the security against unauthorized manipulations of the subscriber identification unit 105 is increased.

In one embodiment, the selection of a subscription data record Si for use during the subscriber authentication is already made at the time of the selection of a mobile telecommunications network 101-$i$ to which the subscriber is being signed in. In this process, the network is preferably selected as a function of which mobile telecommunications networks 101-$i$ have the subscription data records Si stored in the subscriber identification unit 105. In particular, the mobile telecommunications network 101-$i$ selected is always the one that is associated with a subscription data record Si, provided that such a mobile telecommunications network 101-$i$ is available.

In order select a mobile telecommunications network 101-$i$, the mobile telecommunications device 102 determines the mobile telecommunications networks 101-$i$ that are available at the current location of the mobile telecommunications device 102. These are the mobile telecommunications networks 101-$i$ with a base station 103-$i$ from which the mobile telecommunications device 102 receives signals whose strength exceeds a threshold value. In order to identify the mobile telecommunications networks 101-$i$ in the mobile telecommunications device 102, the base stations 103-$i$ of the mobile telecommunications networks 101-$i$ each send out the network identifier of the mobile telecommunications network 101-$i$, which can comprise, for instance, a combination of the MCC and of the MNC. The received network identifiers of the available mobile telecommunications networks 101-$i$ are handed over within the telecommunications device 102 to the subscriber identification unit 105 and used there for purposes of selecting the network.

During the network selection, the controller 106 checks whether a subscription data record Si is stored in the subscriber identification unit 105 for at least one of the available mobile telecommunications networks 101-$i$. If precisely one such mobile telecommunications network 101-$i$ is available, then this mobile telecommunications network 101-$i$ is selected. Moreover, the controller 106 selects the associated subscription data record Si for use during the subscriber authentication.

If the controller 106 ascertains that several mobile telecommunications networks 101-$i$ are available, for each of which a subscription data record Si is associated in the subscriber identification unit 105, then the controller 106 selects one of these mobile telecommunications networks 101-$i$. The selection can be made based on priorities that are associated with the mobile telecommunications networks 101-$i$ or with the subscription data records 101-$i$ within the subscriber identification unit 105. In this process, from among the available mobile telecommunications networks 101-$i$, the controller 106 selects the one whose subscription data record 101-$i$ is accorded the highest priority. Moreover, the associated subscription data record 101-$i$ is selected for use during the subscriber authentication. Among the subscription data records Si stored in the subscriber identification unit 105, the master data record 101-$i$ is preferably accorded the highest priority. In this manner, it is achieved that the main network 101-1 of the subscriber is always selected whenever it is available at the location of the telecommunications device 102.

If the controller 106 ascertains that no subscription data record Si is stored in the subscriber identification unit 105 for any of the available mobile telecommunications networks 101-$i$, then a roaming access is made to one of the available mobile telecommunications networks 101-$i$. In one embodiment, the master data record Si is used for purposes of subscriber authentication. As an alternative, it is possible to select another subscription data record Si that is to be used for the subscriber authentication on the basis of prescribed criteria that are stored in the subscriber identification unit 105. For example, it can be provided that, for one or more countries, a subscription data record Si is specified, which is to be used when the telecommunications device 102 is in that particular country and no subscription data record Si is stored in the subscriber identification unit 105 for any of the available mobile telecommunications networks 101-$i$. In this manner, it can be achieved that the subscriber can simply make use of the generally less expensive domestic roaming and does not have to use international roaming.

The mobile telecommunications network 101-$i$ to which the subscriber is signed in if no subscription data record Si is stored in the subscriber identification unit 105 for any of the available mobile telecommunications networks 101-$i$ is selected based on criteria that are likewise stored in the subscriber identification unit 105. For this purpose, a list can be stored in the subscriber identification unit 105, and this list can contain various mobile telecommunications networks 101-$i$ with different priorities, so that the controller 106 can select the available mobile telecommunications network 101-$i$ with the highest priority in order to sign the subscriber in to the mobile telecommunications network 101-$i$. Likewise, the subscriber can select the mobile telecommunications network 101-$i$, for example, manually through an input using the telecommunications device 102.

After a mobile telecommunications network 101-$i$ and a subscription data record Si have been selected, the telecommunications device 102 logs on to the selected mobile telecommunications network 101-$i$. Subsequently, the subscriber is authenticated in the selected mobile telecommunications network 101-$i$. For this purpose, the subscription data record Si selected by the controller 106 for the subscriber authentication is activated. Regarding the subscription data records Si, which differ from the master data record S1, in one embodiment, this activation is done after the log-on to the mobile telecommunications network 101-$i$, but in other embodiments, it can also already be done before the log-on. The activation of these subscription data records is preferably done on the basis of the master data record S1 that had been previously activated. If the master data record S1 is to be used for the subscriber authentication, it remains activated.

The subscriber authentication comprises the checking of the subscription data and can be done, for example, in the manner already described above. On the network side, the subscriber data Ti that is associated with the activated subscription data record Si and that is stored in the home register 104-$i$ of the mobile telecommunications network 101-$i$ is used in order to check the subscription data when the mobile telecommunications network 101-$i$ is accessed without using roaming. On the basis of the successful subscriber authentication, the subscriber is signed in to the mobile telecommunications network 101-$i$ in question. As long as the subscriber is signed in to the mobile telecommunications network 101-$i$, the subscription data record Si used for the authentication preferably remains activated.

If the telecommunications device 102 loses its connection to the mobile telecommunications network 101-$i$, so that a new network selection and a new log-on to a mobile telecommunications network 101-$i$ become necessary, then the controller 106 preferably first activates the master data record S1 once again if it had not been activated before, i.e. if the subscriber had not been previously signed in to the mobile telecommunications network 101-$i$ using the master data record S1. Then, in the manner already described above, a mobile telecommunications network 101-$i$ and a subscription data record master data record S1 are selected for purposes of signing in to an available mobile telecommunications network 101-$i$. If the connection to a mobile telecommunications network S1 is lost, then as a matter of principle, the master data record S1 is activated first before another subscription data record Si is used for the subscriber authentication for the new network selection.

In given situations, however, the "fallback" to the master data record can be dispensed with and it is possible to switch directly to a subscription data record Si other than the master data record S1. An example of such a situation is a roaming handover in which the connection of the telecommunications device 102 is switched over from a first cell of a first mobile telecommunications network 101-$i$ to a second cell of a second mobile telecommunications network 101-$i$. In this case, based on a subscription data record Si associated with the first mobile telecommunications network 101-$i$, the controller 106 can activate the subscription data record Si that is associated with the second mobile telecommunications network 101-$i$, even if this is not the master data record S1. In particular, the activation can be carried out on the basis of the selection of the target mobile telecommunications network 101-$i$ of the roaming handover, which can take place in the telecommunications device 102 or in the original mobile telecommunications network 101-$i$ (in the latter case, the original mobile telecommunications network 101-$i$ sends a notification to the telecommunications device 102 in which the target mobile telecommunications network 101-$i$ of the roaming handover is specified).

The activation of the optionally present associated control parameters can be coupled to the activation of a subscription data record Si. Here, the only control parameters that are to be activated are preferably always those that are associated with the activated subscription data record Si. Independently of the activation of a specific subscription data record Si, however, it is also possible for the multi-network data in the subscriber identification unit 105 to be accessed. In this manner, in particular, the subscriber always access to his/her personal data and messages, which are stored in the subscriber identification unit 105.

If one or more incomplete subscription data records Si are stored in the subscriber identification unit 105, the selection of a mobile telecommunications network 101-$i$ can in principle be made in the same way as described before taking into consideration the mobile telecommunications networks 101-$i$ associated with the incomplete subscription data records Si. However, upon the selection of a mobile telecommunications network 101-$i$ with which an incomplete subscription data record is associated, a complete subscription data record Si, preferably the master data record Si, is activated. Then, the log-on to the selected mobile telecommunications network 101-$i$ is made using the master data record S1. After log-on, the missing information of the incomplete subscription data record Si is requested from the mobile telecommunications network 101-$i$. As described before, this information may comprise the authentication key of the subscriber for authentication in the mobile telecommunications network 101-$i$. In response to the request, the mobile telecommunications network 101-$i$ sends the information to the subscriber identification unit 105 and there, they are stored in the incomplete subscription data record Si. The request and the storing may be made or controlled by the controller 106 of the subscriber identification unit 105. After the received information has been stored, the controller activates the completed subscription data record Si. The, using this subscription data record, the mobile telecommunications device 102, can be signed in to the mobile telecommunications network 101-$i$ in question. Beforehand, the controller 106 may prompt that the mobile telecommunications device 102 leaves the mobile telecommunications network 101-$i$ which is was signed in to before using the master data record S1.

Using the mechanism described before, it is possible to complete incomplete subscription data records Si. The mechanism can particularly be applied if, due to security considerations or due to other reasons, the missing information is not to be made available for storing in the subscriber identification unit 105 to the manufacturer of the subscriber identification unit 105 or the issuing organization. The missing information needs only to be requested and stored at the first access to the respective mobile telecommunications network 101-$i$. For subsequent accesses the information can be used which are stored in the subscriber identification unit 105 and added at the first access.

In one embodiment, the various subscription data records Si that are stored in the subscriber identity module and the associated subscriber data stored in the home registers 104-$i$ of the mobile telecommunications networks 101-$i$ are each associated with a phone number at which the subscriber can be reached when the associated subscription data record Si is activated. This results from the fact that the subscriber is registered in a home register 104-$i$ as being signed in after he/she has used that particular subscription data record Si to sign in to a mobile telecommunications network 101-$i$ that is associated with the subscriber data Ti that is stored in the home register 104-$i$ in question. This is the case when signing in to the mobile telecommunications network 101-$i$ that is associated with the home register 104-$i$ and when another mobile telecommunications network 101-$i$ is accessed using roaming.

However, it is not necessarily the case that the subscriber can be reached at the phone numbers that are associated with the other deactivated subscription data records Si. Consequently, connection requests for the phone number that, for example, a caller transmits in order to establish a voice or video call to the subscriber are not forwarded to the subscriber, and/or messages addressed to the subscriber at that phone number are not delivered.

In one embodiment, it is ensured that the subscriber can also be reached at the phone number that is associated with him/her in his/her main network when he/she uses another subscription data record Si than the master data record S1 to sign in to a mobile telecommunications network 101-$i$. For this purpose, call forwarding to the phone number associated with the activated subscription data record Si is activated in the home register 104-$i$ of the main network 101-$i$.

Call forwarding can especially be activated within the scope of the log-on of the subscriber to a mobile telecommunications network 101-$i$ selected during the network selection. Here, it can be provided that, after the log-on to the appropriate mobile telecommunications network 101-$i$, the controller 106 of the subscriber identification unit 105 sends a message to the home register 104-1 of the main network 101-1, informing the home register 104-1 that the subscriber was signed in to a mobile telecommunications network 101-$i$ with a subscription data record Si other than the master data record S1. The subscription data record Si employed and/or the associated phone number are likewise indicated in the message. Moreover, the home register 104-1 is informed in the message or via a separate message of the selected mobile telecommunications network 101-*i* as to which mobile telecommunications network 101-*i* the subscriber has signed in. On the basis of the message of the controller 106, call forwarding to the phone number that is associated with the subscription data record Si that is used for the subscriber authentication in the selected mobile telecommunications network 101-*i* is activated in the home register 104-1. If it is not the phone number but rather the subscription data record Si that is specified in the message, then the phone number can be stored in the home register 104-1 in association with the subscription data record Si.

As an alternative to the notification of the home register 104-1 of the main network 101-1 by the controller 106 of the subscriber identification unit 105, it can also be provided that the selected mobile telecommunications network 101-*i* informs the home register 104-1 to this effect when the subscriber logs on to the mobile telecommunications network 101-*i*. For this purpose, at the time of the log-on, the controller 106 can send information about the main network 101-1 of the subscriber and about the subscriber identifier in the main network 101-1 to the selected mobile telecommunications network 101-*i*, or else this information is stored in the mobile telecommunications network 101-*i* in association with the (local) subscriber data Ti.

In one embodiment, the call forwarding is activated when the message is received from the controller 106 or from the selected mobile telecommunications network 101-*i* in the home register 104-1 of the main network 101-1. In another embodiment, the home register 104-1 uses the forwarding phone number to carry out a paging call of the subscriber in the selected mobile telecommunications network 101-*i*, and it only activates the call forwarding once the paging call has been answered. The paging call can be answered by the device 102 of the subscriber after the successful signing in to the selected mobile telecommunications network 101-*i*. In this embodiment, it is avoided that call forwarding is established even though the subscriber has been rejected by the selected mobile telecommunications network 101-*i* during the sign-in procedure.

In one embodiment, during the communication with the home register 104-1 of the main network 101-1, the controller 106 identifies the subscriber on the basis of the subscriber identifier in the main network 101-1, which is associated with or contained in the master data record S1. The master data record S1 can at first still be activated at the time of the log-on to the mobile telecommunications network 101-*i*, especially in order to access it so as to read the subscriber identifier when the controller 106 sends the message to the home register 104-*i* of the main network 101-1. In order to perform the subscriber authentication in the selected mobile telecommunications network 101-*i*, however, the controller 106 activates the subscription data record Si that is to be used for this purpose. If the log-on to the selected mobile telecommunications network 101-*i* takes place while the master data record S1 is activated, then it can also be provided that the controller 106 informs the selected mobile telecommunications network 101-*i* that a subscription data record Si associated with this mobile telecommunications network 101-*i* should be activated and should be used for the subscriber authentication. On the basis of this information, the selected mobile telecommunications network 101-*i* can sign the subscriber in as a home user rather than as a roaming user, and it can make use of the subscriber data stored in the home register 104-*i* for purposes of the subscriber authentication.

The utilization of mobile telecommunications services by the subscriber can be invoiced separately in each mobile telecommunications network 101-*i*. In this case, the user receives several mobile telecommunications invoices. In order to simplify the invoicing, in another embodiment, it is provided that the fees for the utilization of mobile telecommunications services in the plurality of mobile telecommunications networks 101-*i* for each of which one subscription data record Si is stored in the subscriber identification unit 105 of the subscriber can be combined into one mobile telecommunications invoice. This invoice is preferably is the mobile telecommunications invoice that is generated for the main network 101-1 of the subscriber or via an invoicing unit of the main network 101-1. In order to allow the combination, the mobile telecommunication networks 101-*i* in question transmit accounting information to the main network 101-1 or to its invoicing unit. The accounting information contains fees that were accrued by the user when utilizing mobile telecommunications service in the respective mobile telecommunications networks 101-*i*. The transmission can be carried out on the basis of a note in the subscriber data that is stored in the home registers 104-*i* of the mobile telecommunication networks 101-*i*, or else the mobile telecommunication networks 101-*i* transmit the accounting data on the basis of information from the subscriber identification unit 105 that, in each case, is sent to the mobile telecommunication network 101-*i* at the time of the log-on to said mobile telecommunication network 101-*i*.

Although the invention was described in detail in the drawings and in the elaborations above, these are meant for illustration purposes and as examples, and should not to be construed as being limiting in any manner whatsoever. In particular, the invention is not restricted to the explained embodiments.

Additional variants of the invention and its execution ensue for the person skilled in the art from the disclosure given above, from the FIGURES and from the patent claims.

In the patent claims, terms such as "encompass", "comprise", "contain", "have" and the like do not exclude additional elements or steps. The use of the indefinite article does not preclude a plurality. Each individual device can execute the functions of several of the units or devices cited in the patent claims. The reference numerals indicated in the patent claims are not to be construed as a limitation of the means and steps employed.

What is claimed is:

1. A subscriber identifier for subscriber authentication in a mobile telecommunications network, comprising a memory device containing a first subscription data record for subscriber authentication in a first mobile telecommunications network, the memory device further containing a second subscription data record for subscriber authentication in a second mobile telecommunications network, based on an available mobile telecommunications network, one of the contained subscription data records being usable for subscriber authentication, the subscriber identifier further comprising a controller that is configured to activate, based on a received identifier of the available mobile telecommunications network, a subscription data record for subscriber authentication, wherein the controller is further configured to activate a prescribed subscription data record for use in subscriber authentication if no identifier of the first mobile telecommunications network or the second mobile telecommunications network is received, wherein the prescribed subscription data record is selected according to at least one prescribed criterion, and wherein the controller is configured to activate the prescribed subscription data record if a subscription data record associated with an available mobile telecommunications network is incomplete, and wherein after activation of the prescribed subscription data record, a subscriber authentication using the prescribed subscription data record is performed and information is transmitted from the mobile telecommunications network to the subscriber identifier and the information is stored in the incomplete data record.

2. The subscriber identifier recited in claim 1, wherein the controller is configured to activate in response to a receipt of an identifier of a mobile telecommunications network a subscription data record for the subscriber authentication in this mobile telecommunications network.

3. The subscriber identifier recited in claim 1, wherein the controller is configured to activate a prescribed subscription data record when the subscriber identifier is switched on and/or after disconnection of a connection to a mobile telecommunications network.

4. The subscriber identifier recited in claim 1, wherein the first and/or the second subscription data record comprises a subscriber identifier that is registered in the respective mobile telecommunications network, particularly in a home register of the mobile telecommunications network.

5. The subscriber identifier recited in claim 1, wherein the first and/or the second subscription data record comprises at least one cryptographic authentication key.

6. The subscriber identifier recited in claim 1, wherein the memory device contains multi-network data that can be accessed independently of the activation of a subscription data record.

7. A mobile telecommunications device, comprising a subscriber identifier for subscriber authentication in a mobile telecommunications network, the subscriber identifier containing a first subscription data record for subscriber authentication in a first mobile telecommunications network, the subscriber identifier further containing a second subscription data record for subscriber authentication in a second mobile telecommunications network, based on an available mobile telecommunications network, one of the contained subscription data records being usable for subscriber authentication, the subscriber identifier further comprising a controller that is configured to activate, based on a received identifier of the available mobile telecommunications network, a subscription data record for subscriber authentication, wherein the controller is further configured to activate a prescribed subscription data record for use in subscriber authentication if no identifier of the first mobile telecommunications network or the second mobile telecommunications network is received, wherein the prescribed subscription data record is selected according to at least one prescribed criterion, and wherein the controller is configured to activate the prescribed subscription data record if a subscription data record associated with an available mobile telecommunications network is incomplete, and wherein after activation of the prescribed subscription data record, a subscriber authentication using the prescribed subscription data record is performed and information is transmitted from the mobile telecommunications network to the subscriber identifier and the information is stored in the incomplete subscription data record.

8. A mobile telecommunications system, comprising:
a subscriber identifier for subscriber authentication in a mobile telecommunications network, the subscriber identifier containing a first subscription data record for subscriber authentication in a first mobile telecommunications network, the subscriber identifier further containing a second subscription data record for subscriber authentication in a second mobile telecommunications network, based on an available mobile telecommunications network, one of the contained subscription data records being usable for subscriber authentication, the subscriber identifier further comprising a controller that is configured to activate, based on a received identifier of the available mobile telecommunications network, a subscription data record for subscriber authentication, wherein the controller is further configured to activate a prescribed subscription data record for use in subscriber authentication if no identifier of the first mobile telecommunications network or the second mobile telecommunications network is received, wherein the prescribed subscription data record is selected according to at least one prescribed criterion, and wherein the controller is configured to activate the prescribed subscription data record if a subscription data record associated with an available mobile telecommunications network is incomplete, and wherein after activation of the prescribed subscription data record, a subscriber authentication using the prescribed subscription data record is performed and information is transmitted from the mobile telecommunications network to the subscriber identifier and the information is stored in the incomplete subscription data record; and
a mobile telecommunications device.

9. The mobile communications system recited in claim 8, wherein with each of the first and second subscription data records a phone number is associated, and the system further comprising a call forwarder that is configured to initiate, based on a notification about the activation of the second subscription data record, call forwarding from the phone number associated with the first subscription data record to the phone number associated with the second subscription data record.

10. The mobile telecommunications system recited in claim 9, wherein the second mobile telecommunications network is configured to send the notification about the activation to the call forwarder.

11. The mobile telecommunications system recited in claim 8, wherein the first or the second mobile telecommunications network is configured to transmit, after the subscriber authentication in the first or the second mobile telecommunications network using a subscription data record activated in the subscriber identifier, to a mobile telecommunications network associated with a prescribed subscription data record accounting information about a utilization of mobile telecommunications services.

12. A method for authenticating a subscriber in a mobile telecommunications network, comprising:
storing data from a subscription data record in a subscriber identifier;
receiving an identifier of an available mobile telecommunications network;
selecting a prescribed subscription data record based on the received identifier according to at least one prescribed criterion if no identifier of a first mobile telecommunications network or second mobile telecommunications network is received;
activating the prescribed subscription data record for use in subscriber authentication;
obtaining the data used for the subscriber authentication from the activated subscription data record;
transmitting information from the mobile telecommunications network to the subscriber identifier if a subscription data record associated with the available mobile telecommunications network is incomplete; and storing the information in the incomplete subscription data record.

\* \* \* \* \*